(12) United States Patent
Yoo et al.

(10) Patent No.: US 7,813,583 B2
(45) Date of Patent: Oct. 12, 2010

(54) APPARATUS AND METHOD FOR REDUCING NOISE OF IMAGE SENSOR

(75) Inventors: Young-jin Yoo, Yongin-si (KR); Seong-deok Lee, Yongin-si (KR); Hyun-wook Ok, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 11/640,259

(22) Filed: Dec. 18, 2006

(65) Prior Publication Data
US 2007/0177816 A1    Aug. 2, 2007

(30) Foreign Application Priority Data
Jan. 27, 2006    (KR) .................. 10-2006-0008693

(51) Int. Cl.
*G06K 9/40* (2006.01)
(52) U.S. Cl. ......................... 382/264; 382/254
(58) Field of Classification Search ........... 382/254, 382/264, 275, 162, 167; 247/222.1, 241, 247/255, 257, 345, 347, 349, 354, 355, 363–365; 358/136, 174, 227, 228, 426, 906, 909
See application file for complete search history.

(56) References Cited

U.S. PATENT DOCUMENTS

| | | | | |
|---|---|---|---|---|
| 5,786,857 A * | 7/1998 | Yamaguchi | ............ | 375/240.03 |
| 5,825,846 A * | 10/1998 | Aach et al. | ............ | 378/98 |
| 6,512,791 B1 * | 1/2003 | Takayama | ............ | 375/240.01 |
| 2006/0050157 A1 * | 3/2006 | Tsuruoka | ............ | 348/241 |

FOREIGN PATENT DOCUMENTS

| | | |
|---|---|---|
| JP | 2003-274180 A | 9/2003 |
| JP | 2004-128985 A | 4/2004 |
| JP | 2004-228825 A | 8/2004 |

\* cited by examiner

*Primary Examiner*—Yon Couso
(74) *Attorney, Agent, or Firm*—Sughrue Mion, PLLC

(57) ABSTRACT

An apparatus and method for reducing noise of an image sensor are provided. The apparatus includes a noise level setting module setting a noise level representing an image frame expressed as a component in a color space; a kernel generation module generating a kernel for filtering pixels that constitute the image frame based on the set noise level; and a filter application module convoluting the pixels using the generated kernel and normalizing the pixels using the convolution result. Since noise generated by the image sensor can be adaptively reduced, the quality of an output image can be improved.

37 Claims, 7 Drawing Sheets

FIG. 2

$$\text{Noise Level } S = \begin{cases} K_1 & \text{for } 0 \leq I_x < 20 \\ K_2 & \text{for } 20 \leq I_x < 30 \\ K_3 & \text{for } 30 \leq I_x < 40 \\ K_4 & \text{for } 40 \leq I_x < 50 \\ K_5 & \text{for } 50 \leq I_x < 60 \\ K_6 & \text{for } 60 \leq I_x < 70 \\ K_7 & \text{for } 70 \leq I_x < 80 \\ K_8 & \text{for } 80 \leq I_x < 90 \\ K_9 & \text{for } 90 \leq I_x < 100 \\ K_{10} & \text{for } 100 \leq I_x < 110 \\ K_{11} & \text{for } 110 \leq I_x < 120 \\ K_{12} & \text{for } 120 \leq I_x < 130 \\ K_{13} & \text{for } 130 \leq I_x < 140 \\ K_{14} & \text{for } 140 \leq I_x < 150 \\ K_{15} & \text{for } 150 \leq I_x < 160 \\ K_{16} & \text{for } 160 \leq I_x < 170 \\ K_{17} & \text{for } 180 \leq I_x < 200 \\ K_{18} & \text{for } 200 \leq I_x < 220 \\ K_{19} & \text{for } 220 \leq I_x < \end{cases}$$

FIG. 3

| 0.5 | 0.25 | 0.5 | 0.25 | 0.5 |
|---|---|---|---|---|
| 0.25 | 1 | 1 | 1 | 0.25 |
| 0.5 | 1 | 1 | 1 | 0.5 |
| 0.25 | 1 | 1 | 1 | 0.25 |
| 0.5 | 0.25 | 0.5 | 0.25 | 0.5 |

**5*5 KERNEL**

| 0.125 | 0.25 | 0.5 | 0.5 | 0.5 | 0.5 | 0.5 | 0.25 | 0.125 |
|---|---|---|---|---|---|---|---|---|
| 0.25 | 0.5 | 0.5 | 1 | 1 | 1 | 0.5 | 0.5 | 0.25 |
| 0.5 | 0.5 | 0.5 | 1 | 1 | 1 | 0.5 | 0.5 | 0.5 |
| 0.25 | 0.5 | 0.5 | 1 | 1 | 1 | 0.5 | 0.5 | 0.25 |
| 0.125 | 0.25 | 0.5 | 0.5 | 0.5 | 0.5 | 0.5 | 0.25 | 0.125 |

**5*9 KERNEL**

FIG. 7
INPUT IMAGE
OUTPUT IMAGE ACCORDING TO AN
EXEMPLARY EMBODIMENT OF THE
PRESENT INVENTION

US 7,813,583 B2

APPARATUS AND METHOD FOR REDUCING NOISE OF IMAGE SENSOR

CROSS-REFERENCE TO RELATED APPLICATION

This application claims priority from Korean Patent Application No. 10-2006-0008693 filed on Jan. 27, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to reducing noise of an image sensor and, more particularly, to reducing noise of an image sensor, in which the apparatus and method generates a kernel for filtering pixels that constitute an image frame, and filtering the pixels by convoluting and normalizing the pixels using the generated kernel.

2. Description of the Related Art

In the related art, there has been a remarkable development of digital camera technology and commercialization of digital cameras that provide various functions as well as high resolution. Digital cameras may be embedded in handheld digital devices such as mobile phones, notebook computers, and personal digital assistants (PDAs). These related art digital cameras include image sensors such as charge-coupled devices (CCDs) that capture light from a subject and convert the light into an electrical signal and complementary metal oxide semiconductors (CMOSes). However, using related art technology, it is difficult to prevent, at the source, noise generated when an image sensor picks up an image of a subject. Therefore, most related art digital cameras have a function for eliminating or correcting the generated noise. For high-definition images, this function is pertinent.

Related art research includes results on technologies for reducing noise. Related art noise reduction technologies include circuitry technology that passes an image signal through a low pass filer (LPF) and thus suppresses high-frequency components of the image signal, and computational technology that applies a spatial filter having a smoothing function, such as a mean value filter, to an image. However, most of these related art technologies damage properties of an original image in the process of enhancing subjective image quality, or require too much computation from digital cameras with limited resources.

SUMMARY OF THE INVENTION

The present invention an apparatus and method for reducing noise of an image sensor, the apparatus and method adaptively reducing the noise of the image sensor using a kernel for convolution and normalization based on noise characteristics and photographing information.

The present invention also provides an apparatus and method for reducing noise of an image sensor, which can be easily implemented in hardware due to low system complexity and a small amount of computation required.

According to an aspect of the present invention, there is provided an apparatus for reducing noise of an image sensor. The apparatus includes a noise level setting module setting a noise level representing an image frame expressed as a component in a color space; a kernel generation module generating a kernel for filtering pixels that constitute the image frame based on the set noise level; and a filter application module convoluting the pixels using the generated kernel and normalizing the pixels using the convolution result.

According to another aspect of the present invention, there is provided a method of reducing noise of an image sensor. The method includes setting a noise level representing an image frame expressed as a component in a color space; generating a kernel for filtering pixels that constitute the image frame based on the set noise level; and convoluting the pixels using the generated kernel and normalizing the pixels using the convolution result.

BRIEF DESCRIPTION OF THE DRAWINGS

The above and other aspects of the present invention will become more apparent by describing in detail exemplary embodiments thereof with reference to the attached drawings in which:

FIG. 2 illustrates a noise level set for a luma channel according to an exemplary embodiment of the present invention;

FIG. 3 illustrates a kernel controlled by a position-based weight function for the luma channel according to an exemplary embodiment of the present invention;

FIG. 7 compares an input image with an output image according to an exemplary embodiment of the present invention.

DETAILED DESCRIPTION OF THE EXEMPLARY EMBODIMENTS

Figure 1:
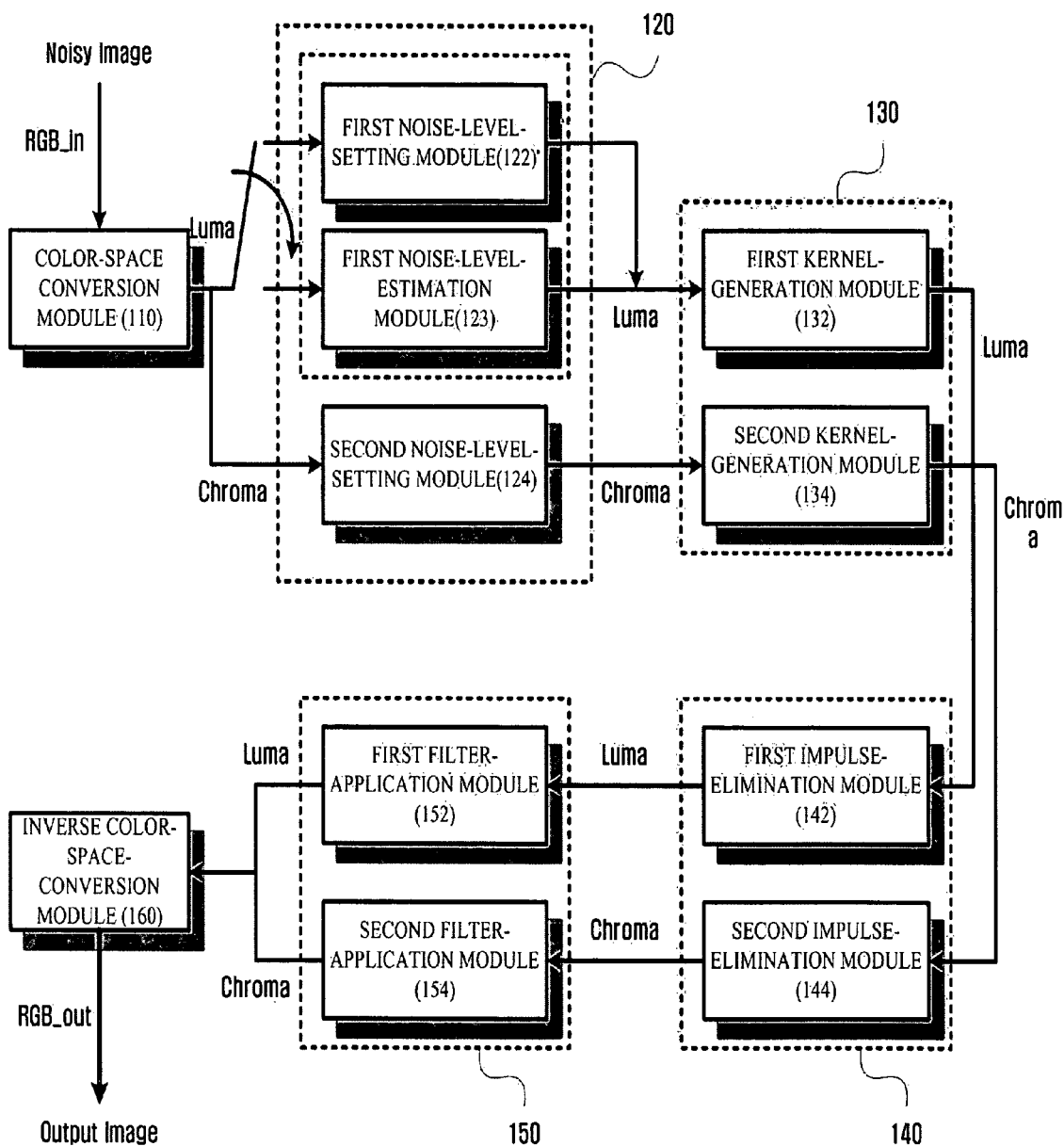
FIG. 1 is a block diagram of an apparatus for reducing noise of an image sensor according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

An apparatus and method for reducing noise of an image sensor will hereinafter be described in detail with reference to the accompanying drawings.

FIG. 1 is a block diagram of an apparatus for reducing noise of an image sensor according to an exemplary embodiment of the present invention. The apparatus includes a color space conversion module 110, a noise level setting module 120, a kernel generation module 130, an impulse elimination module 140, a filter application module 150, and an inverse color space conversion module 160. The image sensor may be a charge-coupled device (CCD), a complementary metal oxide semiconductor (CMOS), or any related art image sensor.

When receiving an image frame, which has a component (red, green and blue (RGB)) of an RGB color space and contains noise, the color space conversion module 110 converts the component of the RGB color space into a component of a luma-chroma color space. Color models are classified into device-dependent color models and device-independent color models. The device-dependent color models include an RGB color model, which is an additive color space model, and a cyan, magenta, yellow and black (CMYK) color model, which is a subtractive color space model. The device-independent color models include a CIE L*a*b color model, a CIE XYZ color model, and a CIE LUV color model. In addition, major color models representing the luma-chroma color space include a YcbCr color model, a YUV color model, and a YIQ color model.

Luminance and chrominance have different characteristics. Therefore, when the input image frame is decomposed into luminance and chrominance components, it can be processed. An equation used to convert the RGB color model into another color model is well known to those of ordinary skill in the art, and thus its detailed description is omitted in this disclosure.

If the input image has the component of the luma-chroma color space instead of the component of the RGB color space, the color space conversion module 110 may be omitted.

To set the level of the noise contained in the input image frame, which was converted into the component of the luma-chroma color space by the color space conversion module 110, the noise level setting module 120 sets a noise level representing an image frame expressed as a component in the luma-chroma color space. Since the noise level is set for each of the luminance and chrominance components, the noise level setting module 120 may include a first noise level setting module 122 and a second noise level setting module 124. The first noise level setting module 122 sets a noise level for a luma channel of the image frame, and the second noise level setting module 124 sets a noise level for a chroma channel of the image frame.

The first noise level setting module 122 sets the noise level for the luma channel according to a luminance value range of an input pixel to be processed, which is included in the input image frame. A method of setting the noise level for the luma channel used by the first noise level setting module 122 is illustrated in FIG. 2. FIG. 2 illustrates a noise level S set for a luma channel according to an exemplary embodiment of the present invention. The noise level S varies according to the luminance value range of an input pixel $I_x$. The noise level S affects a value of a difference-based weight function $f(I_p-I_x)$, which varies according to the difference between the input pixel and each neighborhood pixel. The difference-based weight function is described below in relation to the generation of a kernel for the chroma channel.

When the noise level S is not determined, the noise level S must be estimated. A first noise level estimation module 123 estimates the noise level S. In other words, the first noise level estimation module 123 calculates a trimmed sum of absolute differences (TSAD) in units of masks of a size included in the image frame. The TSAD is obtained by equally spacing pixels in a mask both in horizontal and vertical directions to set pixels of interest and calculating a sum of absolute values of adjacent pixels among the set pixels of interest. If both the horizontal and vertical intervals are 1, all pixels in the mask would be pixels of interest. The horizontal and vertical intervals may be set as parameters so that a user or a manufacturer can adaptively change the parameters according to the performance of a device. For example, in the case of low-end devices such as digital cameras, the horizontal and vertical intervals are set substantially large. In the case of high-end devices such as computers, the horizontal and vertical intervals are set substantially small.

The first noise level estimation module 123 compares the TSAD calculated for each mask with a threshold value $T_{noise}$ and determines a mask region whose TSAD is greater than the threshold value $T_{noise}$ to be a noisy region. Then, a representative value of TSADs of mask regions that are determined to have noise, that is, an estimate of a noise level of one image frame, is calculated. The estimate may be obtained using a mean of the TSADs of the mask regions determined to have noise, a median value of the TSADs of the mask regions, and other various representative values.

The first noise level estimation module 123 performs the above operation on the luminance component, but may not perform the above operation on the chrominance component, since the chrominance component has less detail than the luminance component.

After the noise level S is set for each of the luma and chroma channels, the kernel generation module 130 generates a kernel for filtering the pixels that constitute the image frame based on the set noise level S. In the substantially same manner that the noise level S is set, the kernel may be generated for each of the luminance and chrominance components. Therefore, the kernel generation module 130 may include a first kernel generation module 132 generating a kernel for the luma channel of the image frame and a second kernel generation module 134 generating a kernel for the chroma channel of the image frame.

Each of the first kernel generation module 132 and the second kernel generation module 134 generates a kernel which can be controlled by a weight function. The weight function may be defined by a multiplication of the difference-based weight function $f(I_p-I_x)$, which varies according to the difference $(I_p-I_x)$ between an input pixel $I_p$ to be processed and a neighborhood pixel $I_x$, and a position-based weight function $s(p)$, which varies according to the position of the input pixel $I_p$. In this case, a value obtained as a result of the multiplication is between 0 and 1. As the value is closer to zero, the pixels are filtered using a low weight, and as the value is closer to one, the pixels are filtered using a high weight.

The difference-based weight function $f(I_p-I_x)$ may be defined by Equation (1):

$$f(I_p - I_x) = \exp\left\{-\frac{1}{2}\left(\frac{I_p - I_x}{\lambda \cdot S}\right)^2\right\}, \tag{1}$$

where $I_x$ indicates a value of an input pixel, $I_p$ indicates a value of a neighborhood pixel of the input pixel, $\lambda$ indicates a photographing environment factor, and S indicates a noise level set by the first noise level setting module 122. The photographing environment factor $\lambda$ may be defined by $\lambda = AGC \times w1 + c$ to be proportional to an auto gain control (AGC) value. Alternatively, the photographing environment factor $\lambda$ may be defined by $\lambda = AGC \times w1 + Exposure \times w2 + c$ to be proportional to an exposure value Exposure as well as the AGC value. In this case, AGC indicates an auto gain control value, and Exposure indicates an exposure value. The AGC value and the exposure value Exposure can be easily obtained by reading register values of a device. In addition, w1 and w2 indicate weights for the AGC value and the exposure value Exposure, respectively, and c indicates a constant. A value of w1 must be set relatively greater than that of w2 since the AGC value has a substantially greater effect on noise generation than the exposure value Exposure.

The difference-based weight function $f(I_p-I_x)$ defined by Equation (1) has a Gaussian distribution. Therefore, the further from the center, the smaller the weight function becomes, and the nearer to the center, the larger the weight function becomes. Also, as the difference $(I_p-I_x)$ between the input pixel $I_x$ and the neighborhood pixel $I_p$ becomes smaller and the values of $\lambda$ and S become larger, the weight function becomes closer to 1. Hence, a substantially high weight must be allocated to filter the pixels.

The difference-based weight function $f(I_p-I_x)$ is designed to have the Gaussian distribution, but is not limited thereto. For example but not by way of limitation, the difference-based weight function $f(I_p-I_x)$ may be designed to have various forms of distribution, such as a Poisson distribution.

The kernel generated by the first kernel generation module 132 is controlled not only by the difference-based weight function $f(I_p-I_x)$, but also by the position-based weight function s(p) which varies according to the position of the input pixel. The position-based weight function s(p) is used to perform the bit-shift operation on the input pixel.

In other words, the position-based weight function s(p) reflects the spatial position and distance of the input pixel in the kernel and filters the pixels using the bit-shift operation in order to reduce complicated computation, which is described with reference to FIG. 3.

FIG. 3 illustrates a kernel controlled by the position-based weight function s(p) for the luma channel according to an exemplary embodiment of the present invention. For example, if the AGC value is equal to or smaller than w1 and the exposure value Exposure is equal to or smaller than w2, it can be determined that relatively little noise is included in the image frame. Therefore, a 5×5 kernel is generated as illustrated in the upper part of FIG. 3. In other cases, that is, if the AGC value is greater than 1 or if the exposure value Exposure is greater than w2, it can be determined that greater noise is included in the image frame. Therefore, a 5×9 kernel, which is larger than the 5×5 kernel, is generated as illustrated in the lower part of FIG. 3.

Each figure in FIG. 3 represents each process of the bit-shift operation performed while filtering the pixels. For example, if 1 in the position of $2^3$ in a 4-digit binary number $1000_{(2)}$ is shifted by one digit to the right, $1000_{(2)}$ becomes $0100_{(2)}$. Consequently, $1000_{(2)}$ is reduced by half and represented as 0.5 in the kernel illustrated in FIG. 3. Similarly, if 1 in the position of $2^3$ in the 4-digit binary number $1000_{(2)}$ is shifted by two digits to the right, $1000_{(2)}$ becomes $0010_{(2)}$, which is a quarter of $1000_{(2)}$ and is represented as 0.25 in the kernel illustrated in FIG. 3. If 1 in the position of $2^3$ in the 4-digit binary number $1000_{(2)}$ is shifted by three digits to the right, $1000_{(2)}$ becomes $0001_{(2)}$, which is an eighth of $1000_{(2)}$ and is represented as 0.125 in the kernel illustrated in FIG. 3. Consequently, the bit-shift operation significantly reduces the amount of computation required.

As described above, after the kernel for the luma channel is generated, the kernel for the chroma channel is generated by the second kernel generation module 134. Unlike the difference-based weight function $f(I_p-I_x)$ used by the first kernel generation module 132, a difference-based weight function $f(I_p-I_x)$ used by the second kernel generation module 134 can have a value of 0 or 1. In other words, when an absolute value of the difference $(I_p-I_x)$ is less than a threshold value $T_{chroma}$, there is a high probability that noise is included in the image frame. Hence, 1 is allocated to the difference-based weight function $f(I_p-I_x)$ in order to give a high weight. Conversely, when the absolute value of the difference $(I_p-I_x)$ is equal to or greater than the threshold value $T_{chroma}$, there is a low probability that noise is included in the image frame.

Therefore, 0 is allocated to the difference-based weight function $f(I_p-I_x)$ in order to give a low weight. The threshold value $T_{chroma}$ may be defined by $T_{chroma}=\text{AGC}\times w1+c$ to be proportional to the AGC value. Alternatively, like the photographing environment factor $\lambda$ described above, the threshold value $T_{chroma}$ may be defined by $T_{chroma}=\text{AGC}\times w1+\text{Exposure}\times w2+c$ to be proportional to the exposure value Exposure as well as the AGC value. As described above, the value of w1 must be set relatively greater than that of w2 since the AGC value has a greater effect on noise generation than the exposure value Exposure.

Figure 4:
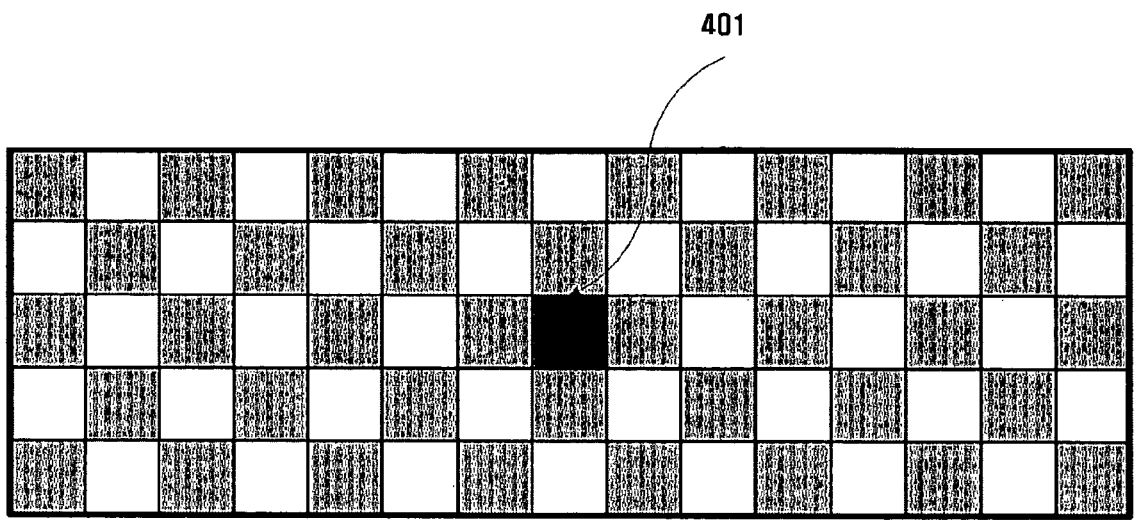
FIG. 4 illustrates a kernel used for sub-sampling a chroma channel according to an exemplary embodiment of the present invention.

The kernel generated by the second kernel generation module 134 is controlled not only by the difference-based weight function $f(I_p-I_x)$, but also by a position-based weight function s(p). Unlike the position-based weight function s(p) used to generate the kernel for the luma channel, the position-based weight function s(p) used to generate the kernel for the chroma channel performs a sub-sampling operation on the input pixel, which will now be described with reference to FIG. 4. FIG. 4 illustrates a kernel used for sub-sampling a chroma channel according to an exemplary embodiment of the present invention. The kernel illustrated in FIG. 4 is a 5×15 kernel. A pixel 401 at the center of the 5×15 kernel is a pixel currently processed, and shaded pixels have a value of 1 and unshaded pixels have a value of 0. Thus, it can be understood that the kernel uses a function which alternately allocates 1 and 0. If the AGC value is greater than w1 or the exposure value Exposure is greater than w2, a kernel larger than the 5×15 kernel illustrated in FIG. 4 can be used.

Next, the impulse elimination module 140 eliminates impulse pixels from the pixels that constitute the image frame. The impulse pixels can be eliminated from each of the luma channel and the chroma channel in the substantially same way as the generation of the kernel and the setting of the noise level. Accordingly, the impulse elimination module 140 may include a first impulse elimination module 142 eliminating the impulse pixels from luminance pixels that constitute the image frame and a second impulse elimination module 144 eliminating the impulse pixels from chrominance pixels that constitute the image frame.

Figure 5:
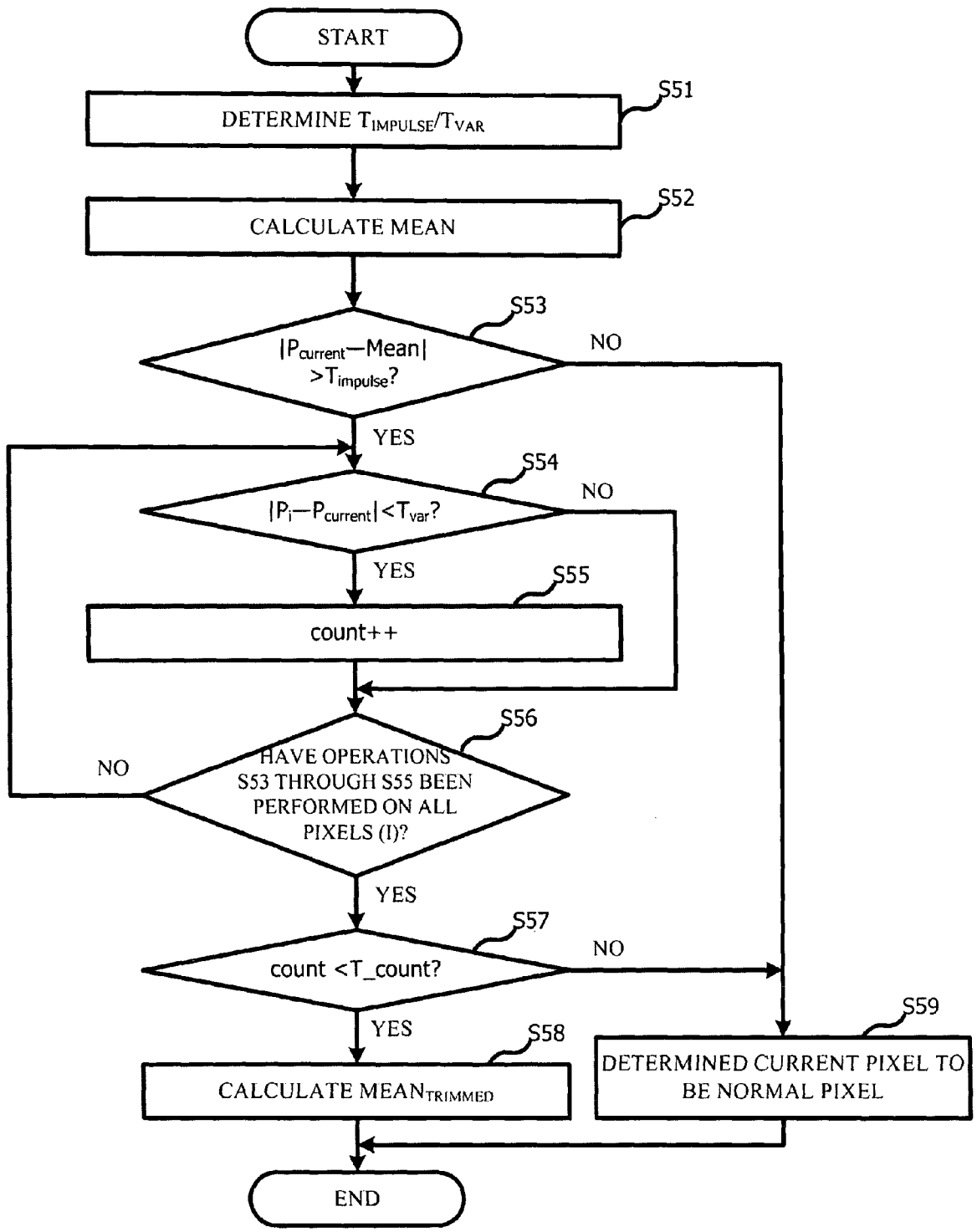
FIG. 5 is a flowchart illustrating a method of eliminating an impulse pixel according to an exemplary embodiment of the present invention.

The impulse pixels denote pixels having values greatly different from actual pixel values and are represented as scattered dots. FIG. 5 is a flowchart illustrating a method of eliminating an impulse pixel according to an exemplary embodiment of the present invention. The first impulse elimination module 142 determines an impulse threshold value $T_{impulse}$ (operation S51). For example, if the impulse threshold value $T_{impulse}$ is greater than a constant a, it may be represented as a. If the impulse threshold value $T_{impulse}$ is equal to or less than the constant a, it may be represented as a sum of a noise estimate for the current image frame and a constant b.

Next, a mean of values of pixels in a boundary block, which is of a size and has a current pixel at its center, is calculated (operation S52). Then, the first impulse elimination module 142 determines whether the difference between a value of the current pixel and the mean of the pixel values is greater than the impulse threshold value $T_{impulse}$ (operation S53). When the difference between the value of the current pixel and the mean of the pixel values is not greater than the impulse threshold value $T_{impulse}$, the first impulse elimination module 142 determines the current pixel to be a normal pixel (operation S59).

When determining in operation S53 that the difference between the value of the current pixel and the mean of the pixel values is greater than the impulse threshold value $T_{impulse}$, the first impulse elimination module 142 also determines whether the difference between a pixel value $P_i$ and a current pixel value $P_{current}$ in the boundary block, which is of the predetermined size and has the current pixel at its center, is less than a threshold value $T_{var}$ (operation S54). When the first impulse elimination module 142 determines that the difference between the pixel value $P_i$ and the current pixel value $P_{current}$ in the boundary block is not less than the threshold value $T_{var}$, operation S56 is performed. Otherwise, a parameter, i.e., count, is increased by a value such as 1 (operation S55), and then operation S56 is performed.

The first impulse elimination module 142 repeats operations S54 and S55 on all pixels within the boundary block (operation S56). Once finished, the first impulse elimination module 142 determines whether the accumulated count is less than T_count (operation S57). If the accumulated count is not less than T_count, the first impulse elimination module 142 determines the current pixel to be a normal pixel (operation S59). Even though the current pixel value $P_{current}$ is different from the mean of the pixel values, when there are more than a number (e.g., T_count) of pixels having values whose differences from the current pixel value $P_{current}$ are less than the predetermined threshold value $T_{var}$ in the boundary block, it is highly likely that the current pixel is included in a high-frequency region, such as a boundary portion of a texture, rather than being an impulse pixel.

If the accumulated count is less than 3, the first impulse elimination module 142 calculates a mean $Mean_{trimmed}$ of pixels excluding the current pixel and the pixels having values whose differences from the current pixel value $P_{current}$ are less than the threshold value $T_{var}$ (operation S58). In so doing, the process of determining whether the current pixel is an impulse pixel is terminated. The above operations are performed on all pixels within the image frame to determine whether any of the pixels within the image frame is an impulse pixel.

The second impulse elimination module 144 also eliminates impulse pixels from the chrominance component. The second impulse elimination module 144 may also use the algorithm used by the first impulse elimination module 142 in order to eliminate the impulse pixels from the chrominance component. However, considering that the chrominance component often has a large grain noise due to its low-frequency characteristics, the second impulse elimination module 144 may use a different algorithm. In other words, if the determination of whether the current pixel is an impulse pixel is made based on neighborhood pixels as in the case of the luminance component, errors may occur. Therefore, in the case of the chrominance component, it is more effective to compare the current pixel with a pixel which is spatially separated from the current pixel by a certain offset.

Assuming that a horizontal offset is $\epsilon$ and a vertical offset is $\lambda$, the second impulse elimination module 144 calculates differences $D_1$ through $D_4$ between the current pixel and four pixels (hereinafter referred to as reference pixels), respectively. Of the four pixels, two pixels are horizontally separated from the current pixel by the horizontal offset $\epsilon$, and the remaining two pixels are vertically separated from the current pixel by the vertical offset $\lambda$. The second impulse elimination module 144 determines whether the differences $D_1$ through $D_4$ exceed an impulse threshold value $T_{impulse}$. Unlike the impulse threshold value $T_{impulse}$ used by the first impulse elimination module 142, the impulse threshold value $T_{impulse}$ used by the second impulse elimination module 142 may be a fixed constant.

Of the differences $D_1$ through $D_4$, when the number of differences that exceed the impulse threshold value $T_{impulse}$ is greater than a number, for example, 3, the second impulse elimination module 144 determines the current pixel to be an impulse pixel. The current pixel may be determined to be an impulse pixel only when all of the differences $D_1$ through $D_4$ exceed the impulse threshold value $T_{impulse}$. However, the second impulse elimination module 144 determines the current to be an impulse pixel when, for example, 3 of the differences $D_1$ through $D_4$ exceed the impulse threshold value $T_{impulse}$, considering that one of the reference pixels may be included in the grain noise. In this way, the process of determining whether the current pixel is an impulse pixel is repeated for all pixels in the image frame.

The filter application module 150 convolutes the pixels using the generated kernels and normalizes the pixels using the convolution results, thereby filtering the pixels.

A first filter application module 152 performs convolution and normalization on the luma channel of the image frame using the generated kernel, thereby filtering the pixels. A second filter application 154 performs convolution and normalization on the chroma channel using the generated kernel, thereby filtering the pixels.

The first filter application module 152 and the second filter application module 154 filter the pixels by performing convolution and normalization using Equation (2):

$$\hat{I}_x = \frac{1}{k(s)} \sum_{p \in W} s(p) f(I_p - I_x) I_p, \quad (2)$$

where k (s) is determined by, $$k(s) = \sum_{p \in W} f(I_p - I_x) s(p),$$

$I_x$ and $I_p$ indicate an input pixel and a neighborhood pixel of the input pixel, respectively, as described above, W indicates a mask window for filtering the pixels, and p indicates a pixel constituting the mask window.

The filter application operation is performed on all pixels that constitute the current image frame.

The inverse color space conversion module 160 converts the pixels of the current image frame filtered by the filter application module 150 from the luma-chroma color space back into the RGB color space. The image frame converted into the component of the RGB color space may be displayed on a display device for a user.

The apparatus for reducing noise of an image sensor has been described above. However, not all of the elements illustrated in FIG. 1 are required. For example, the first noise level estimation module 123 and the impulse elimination module 140 may be omitted without departing from the scope of the invention. In addition, when an image frame input to the apparatus is not a component of the RGB color model, but a component of an YcbCr, YUV, or YIQ color model, the color space conversion module 110 and the inverse color space conversion 160 may be omitted.

As described above, the luminance component and the chrominance component are processed using different algorithms. However, processing the luminance component and the chrominance component using the same algorithm is still within the scope of the present invention. Furthermore, the noise reduction operation may be performed on any one of the luminance component and the chrominance component.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented to execute one or more central processing units (CPUs) in a device.

Figure 6:
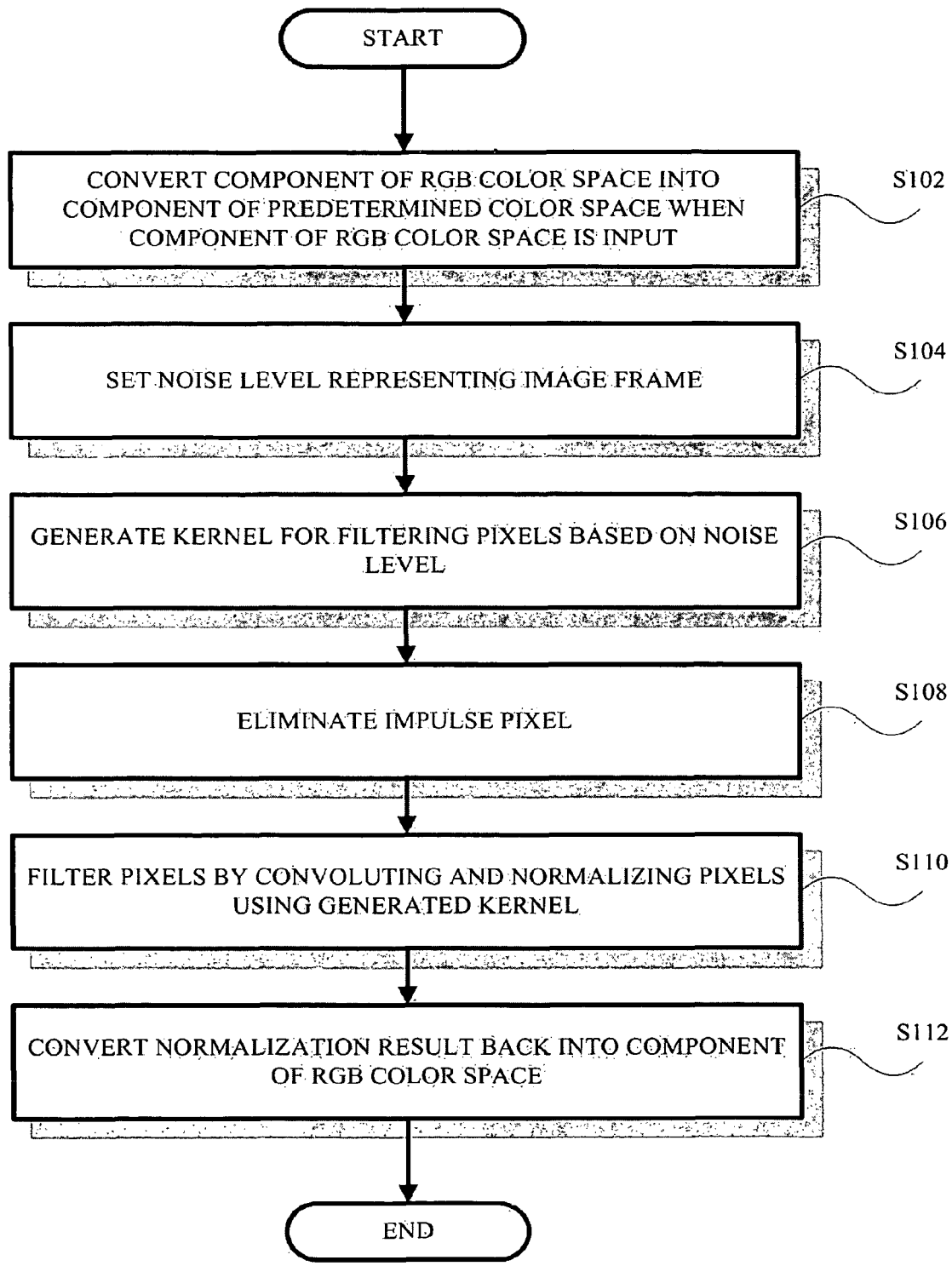
FIG. 6 is a flowchart illustrating a method of reducing noise of an image sensor according to an exemplary embodiment of the present invention.

Hereinafter, an exemplary embodiment will be described in chronological order with reference to FIG. 6, which is a flowchart illustrating a method of reducing noise of an image sensor according to an exemplary embodiment.

When a component of the RGB color space is input, the color space conversion module 110 converts the component of the RGB color space into a component of a color space (operation S102). In the present exemplary embodiment, the component of the RGB color space is converted into a component of one of a YcbCr color space, a YUV color space, and a YIQ color space.

The noise level setting module 120 sets a noise level representing an image frame expressed as a component in the predetermined color space (operation S104). Then, the kernel generation module 130 generates a kernel for filtering the pixels that constitute the image frame based on the set noise level (operation S106). The impulse elimination module 140 eliminates impulse pixels from the pixels that constitute the image frame (operation S108). The filter application module 150 convolutes the pixels using the generated kernel and normalizes the pixels using the convolution result (operation S110). Finally, the inverse color space conversion module 160 converts the normalized result back into the component of the RBG color space (operation S112).

FIG. 7 compares an input image with an output image according to an exemplary embodiment. The quality of the output image displayed in the right part of FIG. 7 according to an exemplary embodiment is obtained after noise is reduced from the input image displayed in the left part of FIG. 7. Hence, the output image has improved image quality.

According to the exemplary embodiments of the present invention, noise generated by an image sensor can be adaptively reduced, and thus the quality of an output image can be enhanced.

The above and other effects of the exemplary embodiment(s) will become more apparent to one of daily skill in the art to which the present invention pertains by referencing the following claims.

It is obvious to those of ordinary skill in the art that the present invention can also be implemented as computer-readable code on a computer-readable recording medium.

While the present invention has been particularly shown and described with reference to exemplary embodiments thereof, it will be understood by those of ordinary skill in the art that various changes in form and details may be made therein without departing from the spirit and scope of the present invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for reducing noise of an image sensor, the apparatus comprising:
    a processor which executes an operation of:
    a noise level setting module that sets a noise level representing an image frame expressed as a component in a color space;
    a kernel generation module that generates a kernel for filtering pixels constituting the image frame based on the noise level set by the noise level setting module; and
    a filter application module that convolutes the pixels using the kernel and normalizes the pixels based on a convolution result.

2. The apparatus of claim 1, wherein the color space is at least one of a YcbCr color space, a YUV color space, and a YIQ color space.

3. The apparatus of claim 1, wherein the noise level setting module comprises:
    a first noise level setting module that sets a noise level for a luma channel of the image frame; and
    a second noise level setting module that sets a noise level for a chroma channel of the image frame.

4. The apparatus of claim 3, wherein the first noise level setting module varies the noise level according to a luminance value range of an input pixel to be processed.

5. The apparatus of claim 3, further comprising a first noise level estimation module that calculates a trimmed sum of absolute differences (TSAD) for the image frame in units of masks of a frequency and size, compares the TSAD with a noise threshold value, calculates a representative value of the TSAD, which is greater than the noise threshold value, and estimates the noise level when the noise level for the luma channel has not been set.

6. The apparatus of claim 1, wherein the kernel generation module comprises:
    a first kernel generation module that generates a kernel for the luma channel of the image frame; and
    a second kernel generation module that generates a kernel for the chroma channel of the image frame.

7. The apparatus of claim 6, wherein each of the first kernel generation module and the second kernel generation module each generate a kernel controlled by a multiplication of a difference-based weight function that varies according to a difference between the input pixel and a neighborhood pixel, and a position-based weight function that varies according to the position of the input pixel, and a value obtained as a result of the multiplication is a value between 0 and 1.

8. The apparatus of claim 7, wherein the difference-based weight function of the first kernel generation module is defined by $$f(I_p - I_x) = \exp\left\{-\frac{1}{2}\left(\frac{I_p - I_x}{\lambda \cdot S}\right)^2\right\},$$

where $I_x$ indicates the input pixel, $I_p$ indicates a neighborhood pixel of the input pixel, $\lambda$ indicates a photographing environment factor, and S indicates the noise level.

9. The apparatus of claim 8, wherein the photographing environment factor $\lambda$ is proportional to an auto gain control (AGC) value.

10. The apparatus of claim 7, wherein the position-based weight function of the first kernel generation module performs a bit-shift operation on the input pixel.

11. The apparatus of claim 7, wherein the difference-based weight function of the second kernel generation module assigns a value of 1 when an absolute value of the difference is less than a threshold value $T_{chroma}$ and assigns a value of 0 when the absolute value of the difference is equal to or greater than the threshold value $T_{chroma}$.

12. The apparatus of claim 11, wherein the threshold value $T_{chroma}$ is substantially proportional to an AGC value.

13. The apparatus of claim 7, wherein the position-based weight function of the second kernel generation module alternately assigns a value of 1 and a value of 0 to the neighborhood pixels by sub-sampling the input pixel.

14. The apparatus of claim 1, further comprising an impulse elimination module that eliminates an impulse pixel from the pixels that constitute the image frame.

15. The apparatus of claim 14, wherein the impulse elimination module comprises:
a first impulse elimination module that eliminates an impulse pixel from luminance pixels that constitute the image frame; and
a second impulse elimination module that eliminates an impulse pixel from chrominance pixels that constitute the image frame.

16. The apparatus of claim 1, wherein the filter application module comprises:
a first filter application module that filters the pixels by convoluting and normalizing the pixels using the kernel generated for the luma channel of the image frame; and
a second filter application module that filters the pixels by convoluting and normalizing the pixels using the kernel generated for the chroma channel of the image frame.

17. The apparatus of claim 16, wherein the first filter application module and the second filter application module filter the pixels by convoluting and normalizing the pixels as defined by $$\hat{I}_x = \frac{1}{k(s)} \sum_{p \in W} s(p) f(I_p - I_x) I_p,$$

where k (s) is determined by $$k(s) = \sum_{p \in W} f(I_p - I_x) s(p),$$

$I_x$ indicates the input pixel to be processed, $I_p$ indicates the neighborhood pixel of the input pixel, W indicates a mask window configured for filtering the pixels, p indicates a pixel that constitute the mask window, f $(I_p-I_x)$ indicates the difference-based weight function which varies according to a difference $(I_p-I_x)$ between the input pixel and the each neighborhood pixel, and s (p) indicates the position-based weight function which varies according to the position of the input pixel.

18. The apparatus of claim 1, further comprising:
a color space conversion module that converts a component of a red, green and blue (RGB) color space into a component of a color space when the component of the RGB color space is input; and
an inverse color space conversion module that converts the normalization result into the component of the RGB color space.

19. A computer implemented method of reducing noise of an image sensor, the method comprising:
setting a noise level that is representative of an image frame expressed as a component in a color space by a noise level setting module of the computer;
generating a kernel that filters pixels that constitute the image frame based on the noise level set by the setting by a kernel generation module of the computer; and
convoluting the pixels using the kernel and normalizing the pixels using a result of the convoluting by a filter application module of the computer.

20. The method of claim 19, wherein the color space is at least one of a YcbCr color space, a YUV color space, and a YIQ color space.

21. The method of claim 19, wherein the setting the noise level comprises:
setting a noise level for a luma channel of the image frame; and
setting a noise level for a chroma channel of the image frame.

22. The method of claim 21, wherein the setting the noise level for the luma channel comprises varying the noise level according to a luminance value range of an input pixel to be processed.

23. The method of claim 21, further comprising calculating a trimmed sum of absolute differences (TSAD) for the image frame in units of masks of a frequency and size, comparing the TSAD with a noise threshold value, calculating a representative value of the TSAD, which is greater than the noise threshold value, and estimating the noise level when the noise level for the luma channel is not set.

24. The method of claim 19, wherein the generating the kernel comprises:
generating a kernel for the luma channel of the image frame; and
generating a kernel for the chroma channel of the image frame.

25. The method of claim 24, wherein the generating the kernel for the luma channel and the generating the kernel for the chroma channel comprise generating a kernel that is controlled by a multiplication of a difference-based weight function that varies according to a difference between the input pixel and each neighborhood pixel, and a position-based weight function, which varies according to the position of the input pixel, and a value obtained as a result of the multiplication is between 0 and 1.

26. The method of claim 25, wherein the difference-based weight function in the generating the kernel for the luma channel is defined by $$f(I_p - I_x) = \exp\left\{-\frac{1}{2}\left(\frac{I_p - I_x}{\lambda \cdot S}\right)^2\right\},$$

where $I_x$ indicates the input pixel, $I_p$ indicates a neighborhood pixel of the input pixel, $\lambda$ indicates a photographing environment factor, and S indicates the noise level.

27. The method of claim 26, wherein the photographing environment factor $\lambda$ is proportional to an auto gain control (AGC) value.

28. The method of claim 25, wherein the position-based weight function in the generating the kernel for the luma channel performs a bit-shift operation on the input pixel.

29. The method of claim 25, wherein the difference-based weight function in the generating the kernel for the chroma channel assigns a value of 1 when an absolute value of the difference is less than a threshold value $T_{chroma}$ and assigns a value of 0 when the absolute value of the difference is equal to or greater than the threshold value $T_{chroma}$.

30. The method of claim 29, wherein the predetermined value $T_{chroma}$ is proportional to an AGC value.

31. The method of claim 25, wherein the position-based weight function in the generating the kernel for the chroma channel alternately assigns values of 1 and 0 to the neighborhood pixels by sub-sampling the input pixel.

32. The method of claim 19, further comprising eliminating an impulse pixel from the pixels that constitute the image frame.

33. The method of claim 32, wherein the eliminating the impulse pixel comprises:
   eliminating an impulse pixel from luminance pixels that constitute the image frame; and
   eliminating an impulse pixel from chrominance pixels that constitute the image frame.

34. The method of claim 19, wherein the convoluting the pixels comprises:
   filtering the pixels by convoluting and normalizing the pixels using the kernel generated for the luma channel of the image frame; and
   filtering the pixels by convoluting and normalizing the pixels using the kernel generated for the chroma channel of the image frame.

35. The method of claim 34, wherein the filtering the pixels by convoluting and normalizing the pixels using the kernel generated for the luma channel of the image frame and the chroma channel of the image frame comprises filtering the pixels by convoluting and normalizing the pixels using $$\hat{I}_x = \frac{1}{k(s)} \sum_{p \in W} s(p) f(I_p - I_x) I_p,$$

where k (s) is determined by $$k(s) = \sum_{p \in W} f(I_p - I_x) s(p),$$

$I_x$ indicates the input pixel to be processed, $I_p$ indicates the neighborhood pixel of the input pixel, W indicates a mask window for filtering the pixels, p indicates a pixel that constitute the mask window, f $(I_p - I_x)$ indicates the difference-based weight function which varies according to the difference $(I_p - I_x)$ between the input pixel and the each neighborhood pixel, and s (p) indicates the position-based weight function which varies according to the position of the input pixel.

36. The method of claim 19, further comprising:
   converting a component of an RGB color space into a component of a color space when the component of the RGB color space is input; and
   converting the normalization result back into the component of the RGB color space.

37. A computer-readable recording medium on which a program code for executing a method of reducing noise of an image sensor is recorded, the method comprising:
   setting a noise level that is representative of an image frame expressed as a component in a color space;
   generating a kernel that filters pixels that constitute the image frame based on the noise level set by the setting; and
   convoluting the pixels using the generated kernel and normalizing the pixels using the convolution result.

* * * * *